United States Patent [19]

Mizukami et al.

[11] 4,143,290
[45] Mar. 6, 1979

[54] SUPPORTING DEVICE FOR ROTOR WINDING IN ROTARY ELECTRIC MACHINE

[75] Inventors: Satoshi Mizukami; Etsuhiko Shoyama; Kenji Matsunobu; Masatosi Taniguchi; Kuniyoshi Konno; Katunori Kimura, all of Hitachi, Japan

[73] Assignee: Hitachi, Ltd., Japan

[21] Appl. No.: 722,422

[22] Filed: Sep. 13, 1976

[30] Foreign Application Priority Data

Mar. 5, 1975 [JP] Japan .................................. 50-25997

[51] Int. Cl.$^2$ .............................................. H02K 3/46
[52] U.S. Cl. ..................................... 310/270; 310/59; 310/61
[58] Field of Search ................. 310/270, 260, 262, 43, 310/45, 61, 57, 59, 60, 65, 52, 55, 264, 261; 336/197

[56] References Cited

U.S. PATENT DOCUMENTS

| | | |
|---|---|---|
| 2,712,085 | 6/1955 | Willyoung .......................... 310/270 |
| 3,189,769 | 6/1965 | Willyoung ........................... 310/52 |
| 3,324,324 | 6/1967 | Richardson ....................... 310/270 |
| 3,395,299 | 7/1968 | Quay ..................................... 310/61 |
| 3,718,830 | 2/1973 | Philofsky ............................ 310/64 |
| 3,849,680 | 11/1974 | Heller .................................. 310/61 |
| 3,891,877 | 6/1975 | Shapiro .............................. 310/61 |

Primary Examiner—R Skudy
Attorney, Agent, or Firm—Craig & Antonelli

[57] ABSTRACT

A rotor for use in a rotary electric machine, which rotor includes a rotary shaft, a core on the shaft, windings wound around the core and having axial end portions thereof protruded from the axial ends of the core respectively, retaining rings each fixedly mounted on the shaft and extending around the outer peripheral surface of each protruded end portion of the windings for preventing each protruded end portion from being radially outwardly moved during the rotation of the shaft, and shielding layers each positioned between the inner peripheral surface of each retaining ring and the outer peripheral surface of each protruded end portion of the windings for preventing the cooling gas from being in contact with the inner peripheral surface of each of the retaining rings.

7 Claims, 5 Drawing Figures

SUPPORTING DEVICE FOR ROTOR WINDING IN ROTARY ELECTRIC MACHINE

BACKGROUND OF THE INVENTION

This invention relates to improvements in a rotor for use in a rotary electric machine, particularly to improvements in a rotor having winding-retaining rings mounted adjacent to the axial ends of a rotor core, respectively.

In general, the rotor in a rotary electric machine is arranged such that a rotor core is fitted on a rotary shaft, and insulated windings are wound around the core. With such an arrangement, the windings are retained in position by means of wedges and retaining rings. More particularly, part of windings which extends in grooves in the core is retained relative to the core by means of wedges forcedly fitted in the grooves, while axial end portions of windings, which are protruded from the axial ends of the core respectively, are retained in position by means of cylindrical retaining rings respectively which surround the peripheries of the protruded end portions of the windings respectively and are secured to a rotary shaft.

Thus, the retaining rings retain in position the end portions of the windings respectively so as to prevent the end portions from being radially outwardly moved due to the centrifugal force during the rotation of the rotor. However, with the rotor designed for a high peripheral speed, there results an extremely large centrifugal force in the protruded end portions of windings, in addition to the centrifugal force acting on the retaining rings. As a result, extremely severe hoop stress acts on each retaining ring. For this reason, each retaining ring should afford a tough construction and be made of a material having high strength.

Meanwhile, limitations are imposed on a material of the retaining ring, because of a need to use a non-magnetic steel, the aforesaid limitations arising from the consideration on a magnetic influence of the retaining rings during their operation as well as from the availability of a material.

In the practical application, however, considerations are given to the shape of each retaining ring itself and the arrangement of each retaining ring for minimizing stress to be created thereon.

With a high-capacity electric machine or a rotor designed for a high peripheral speed, which have to be subjected to severe stress, the diameter and thickness of each retaining ring are somewhat increased, while sacrificing compactness of an electric machine.

Meanwhile, heat power plants are often constructed in a site or on a bridge constructed in the sea. In such a case, it happens that cooling gas for use in a rotary electric machine necessarily contains salt or moisture to some extent.

The cooling gas containing such impurities exerts an adverse influence on the strength of each retaining ring for the reason which will be described hereinafter. Test results reveal that such chemical attacks can not be overcome only by resorting to an increase in wall thickness of each retaining ring.

More specifically, inclusion of salt and moisture in cooling gas leads to a most thorny problem, i.e., corrosion in members of a rotary electric machine which are made of steels in majority.

Many attempts have been proposed to prevent the members of a rotary electric machine from being subjected to corrosion, for instance, the application of a corrosion-preventive coating. Meanwhile, it is true that, even if corrosion takes place, there remains only a reduction in thickness of steel members, providing no serious problem for the operation of an electric machine. However, this can not be neglected in the aforesaid retaining ring of a rotor. During the tests given by the inventors, considerations have been given to the facts that a centrifugal force is produced on a rotor due to its rotation and cooling gas is used for cooling the protruded end portions of the windings housed respectively in chambers defined by the inner peripheral surfaces of the retaining rings and the periphery of the shaft, and that salt and moisture are collected on the inner peripheral surfaces of the retaining rings under the action of a centrifugal force. Thus, a combination of stresses arising from the aforesaid centrifugal force with the influence of the aforesaid salt and moisture leads to a stress-corrosion-cracking problem in the inner peripheral surfaces of the retaining rings. It was found that due to the aforesaid cracking, the retaining rings would cause a premature failure during their service, because of a sudden build-up of stresses.

As has been described, it would be no serious problem, if retaining rings cause simple corrosion, i.e., reduction in wall thickness, like the other parts such as wedges or a current-collecting ring, which would cause no sudden build-up of stresses. The stress-corrosion cracking as caused in the retaining rings is considered to be attributed to the fact that when the cooling gas is introduced through inlet openings in end rings into the aforesaid chambers, then the cooling gas is forced toward inner peripheral surfaces of the retaining rings due to a centrifugal force created by the rotation of a rotor, so that the cooling gas containing moisture and particularly salt clings to the inner peripheral surfaces of the retaining rings, with the result that moisture is evaporated due to heat in the retaining rings (heat transmitted from windings), thereby leaving salt thereon. A repeated cycle of such a phenomena leads to an increase in concentration of salt, whereby stress-corrosion cracking tends to take place on a portion of the inner periphery of each retaining ring adjacent to the inlet openings for the cooling gas most frequently, because the salt is apt to most likely cling to the portion of the inner periphery of each retaining ring.

SUMMARY OF THE INVENTION

In view of the aforesaid problems encountered with prior art rotary electric machines, it is an object of the present invention to provide a rotor of the type described, in which retaining rings used therein are free of stress-corrosion-cracking at a high reliability, even if impurities such as salt and the like are contained in cooling gas.

It is an another object of the present invention to provide a rotor of the type described, in which when retaining rings are subjected to be shrinkage-fitted on a rotary shaft, there may be achieved easy assembly of retaining rings.

According to the present invention, there is provided a rotor for use in a rotary electric machine, comprising: a rotary shaft; a core secured on the rotary shaft; windings wound around said core and having axial end portions thereof protruded from axial ends of the core, respectively; retaining rings fixedly mounted on the rotary shaft in concentric relation to said shaft and extending around the outer peripheral surfaces of said protruded end portions of the windings respectively for preventing the protruded end portions from being radially outwardly moved during the rotation of the rotary shaft, each of said retaining rings defining an annular space between its inner peripheral surface and the outer peripheral surface of the rotary shaft, in which cooling gas is introduced in said annular spaces; and shielding layers each positioned between the inner peripheral surface of each of the retaining rings and the outer peripheral surface of each of the protruded end portions of the windings for preventing cooling gas from being in contact with the inner peripheral surfaces of the retaining rings.

Figure 1:
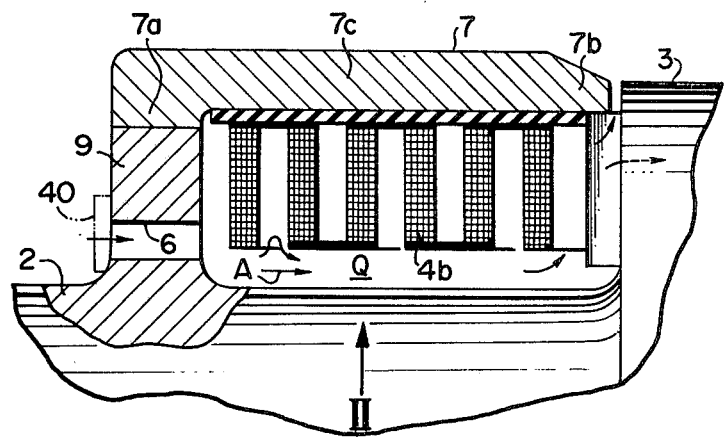
FIG. 1 is a longitudinal cross-sectional view of part of a prior art rotor.
Figure 2:
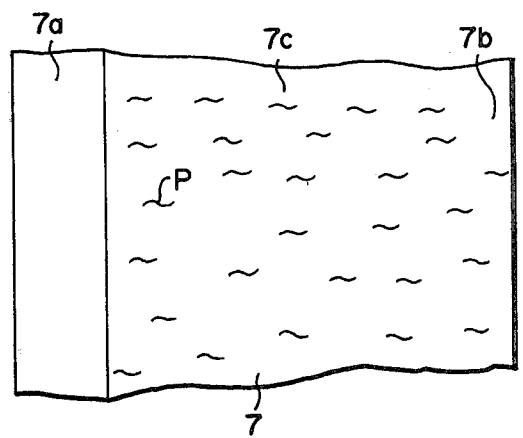
FIG. 2 is a view showing the inner peripheral surface of a retaining ring according to the prior art, as viewed in the direction of arrows II of FIG. 1.

DESCRIPTION OF THE PRIOR ART (FIGS. 1 and 2)

For better understanding of the rotor according to the invention, prior art rotors will be described with reference to FIGS. 1 and 2. It is to be understood that although the following descriptions are given on the arrangement only at one side of a rotor with respect to a core, the rotor has the identical arrangement at both sides thereof with respect to the core. As shown in FIG. 1, a retaining ring 7 includes a mounting portion 7a which is fitted on an end ring 9 of a rotary shaft 2 rigidly. The retaining ring 7 further includes a tail portion 7b and a body portion 7c surrounding an end portion 4b of windings which protrudes from the axial end of the core 3, thereby preventing the end portion 4b from being radially outwardly moved, during the rotation of the rotary shaft 2. Cooling gas is introduced through inlet openings 6 in the end ring 9 into the chamber Q defined by the inner peripheral surface of the retaining ring 7 and the periphery of the rotary shaft 2, as shown by arrows A. According to the tests given by the inventors to the prior art rotor, stress-corrosion cracking takes place in the inner peripheral surface of the retaining ring as shown in FIG. 2. As can be seen from FIG. 2, a plurality of stress-corrosion cracks P appear in a portion close to the inlet openings 6 for the cooling gas, or in a portion which stresses most likely take place.

Another test reveals that no stress-corrosion cracking appears in the inner peripheral surface of the retaining ring 7 during the operation for the same period of time as that of the former test, when a closure plate 40 for the inlet openings 6 is provided as shown by a broken line in FIG. 1. In the light of the results of tests including other tests, the stress-corrosion cracking is considered to be attributable to the fact that when cooling gas is introduced through the inlet openings 6 in the end ring 9 into the chamber Q, then the cooling gas is forced toward the inner periphery of the retaining ring 7 due to the centrifugal force created by the rotation of the rotor, so that the cooling gas containing moisture and particularly salt clings to the inner peripheral surface of the retaining ring, with the result that the moisture is evaporated due to heat in the retaining ring (heat transmitted from windings), leaving salt thereon. A repeated cycle of such a phenomenon leads to an increase in concentration of salt, whereby stress-corrosion cracking tends to take place on a portion of the inner periphery of the retaining ring adjacent to the inlet openings for the cooling gas most frequently, because salt is apt to cling to the portion of the inner periphery of the retaining ring most likely.

Figure 3:
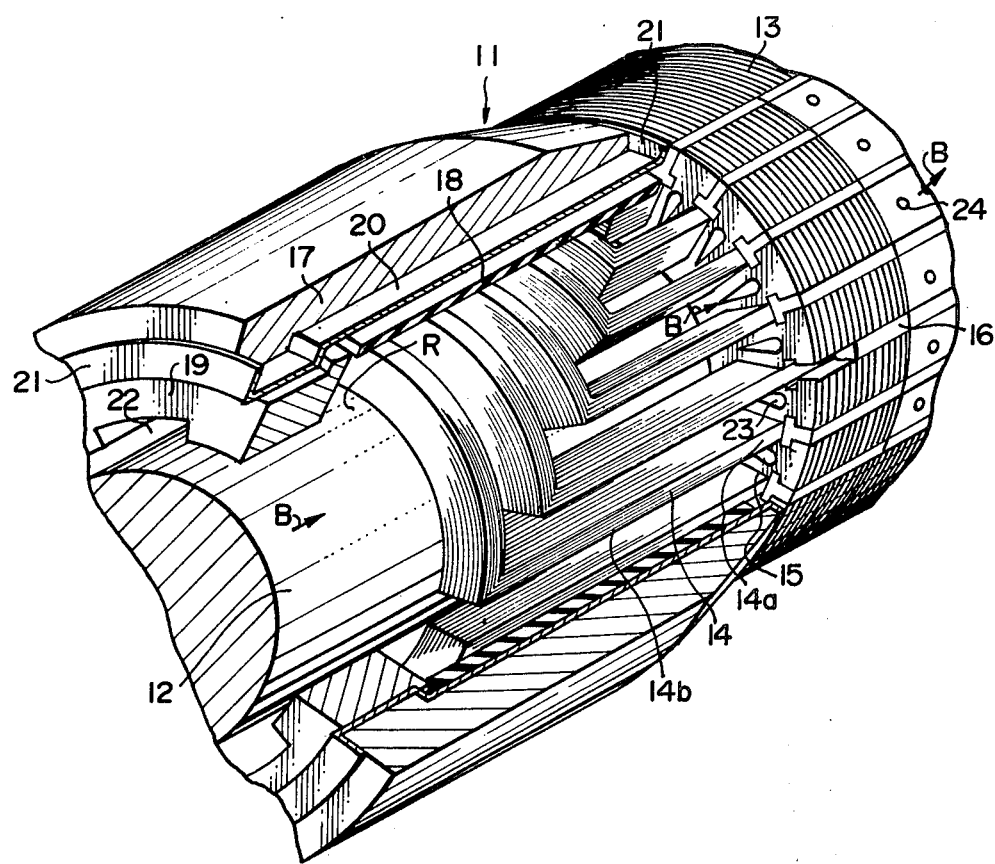
FIG. 3 is a perspective view, partly broken away, of an essential part of one embodiment of a rotor according to the present invention.
Figure 4:
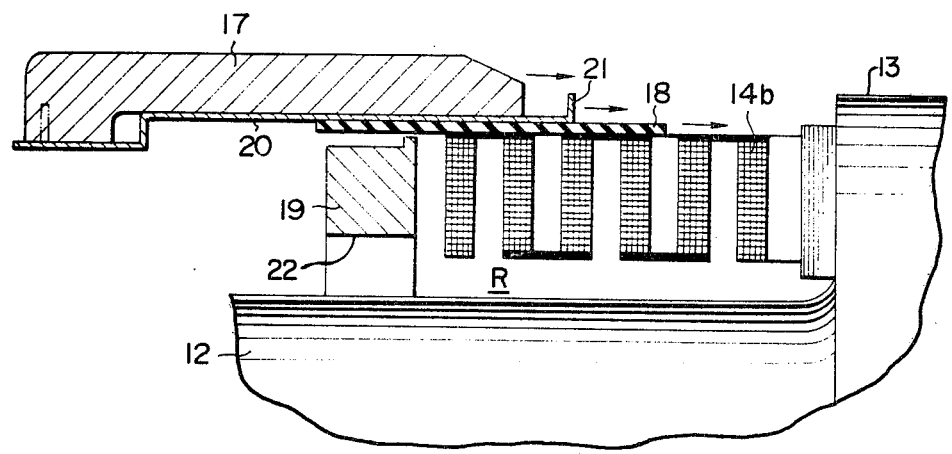
FIG. 4 is a longitudinal cross-sectional view showing an assembled condition of a retaining ring.
Figure 5:
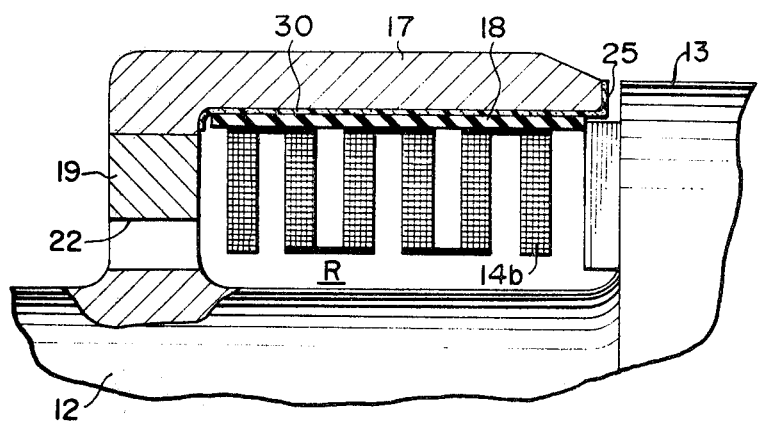
FIG. 5 is a longitudinal cross-sectional view of another embodiment of the rotor according to the invention.

DESCRIPTION OF THE PREFERRED EMBODIMENTS (FIGS. 3 to 5)

Description will now be turned to a rotor according to the present invention with reference to FIGS. 3 to 5. It is to be understood that although the following descriptions are given on the arrangement only at one side of a rotor with respect to a core, the rotor has the identical arrangement at both sides thereof with respect to the core. FIG. 3 shows a part of a rotor used in a turbine generator, i.e., a fragmental view of an end portion of windings in a rotor.

A rotor 11 comprises a rotary shaft 12, a core 13 fixedly mounted on the shaft 12, and windings 14 wound around the core 13. The core 13 is formed with a plurality of winding grooves 15 extending in the axial direction but in the outer peripheral surface of the core 13, and retained on the rotary shaft 12 rigidly. Linear portions 14a of the windings 14 are received in the winding grooves 15 in the core 13. The windings have an end portion 14b thereof which is protruded from the end of the core 13, in a manner to wind around the core so as to produce polarities.

For preventing the windings 14 from being radially outwardly moved due to the centrifugal force during the rotation of the rotor, there are provided wedges 16 forcedly fitted into the grooves 15 for the linear portions 14a of the windings, and a retaining ring 17 of a cylindrical form for the end portion 14b of the winding in a manner to surround same.

Since the retaining ring 17 causes a current loss by being subjected to magnetic flux leaking from stator windings during operation, the retaining ring 17 should be made of, for instance, an austenite-base non-magnetic steel. The retaining ring 17 itself is shrinkage-fitted through the medium of an end ring 19 on the rotary shaft 12, the end ring 19 being positioned adjacent to the end portion 14b of windings.

As shown in FIG. 3, the retaining ring 17 is positioned in a manner to surround the outer periphery of the end portion 14b. If the retaining ring, which is conductive, is directly fitted on the end portion of windings, there arises a possibility that the windings are urged to the inner periphery of the retaining ring under the action of a centrifugal force or that the windings are in sliding contact with the inner peripheral surface of the retaining ring due to thermal elongation, so that an insulating cover on the surface of the windings is damaged, thus shortcircuiting the windings each other through the medium of the retaining ring. For protecting the windings from shortcircuiting, there is provided an insulating cylindrical member 18 which is positioned between the two members, i.e., the retaining ring and the end portion 14b of the windings.

In addition, there is provided a shielding layer 20 between the cylindrical insulating member 18 and the retaining ring 17 in a manner to cover the inner peripheral surface of the ring 17.

The shielding layer 20 is formed into a cylindrical shape so as to fit on the insulating cylindrical member 18 and seals the interior of the layer 20 from the exterior thereof. The shielding layer 20 should preferably be made of a non-magnetic and corrosion-resisting material such as aluminum, stainless steel and the like.

In addition, the shielding layer 20 should preferably be formed from a cylindrical material having a small thickness. However, the layer 20 may be provided by forming a metal sheet into a cylindrical shape. In this case, the mating edges of the sheet should be joined together in air-tight relation.

The shielding layer 20 thus prepared is mounted on a rotor in a manner as shown in FIG. 4. In other words, the shielding layer 20 is fitted on the insulating cylindrical member 18 which covers or surrounds the end portion 14b of the windings, and thereafter the retaining ring 17 is fitted on the cylindrical shielding layer 20, with the end portion of the ring 17 being shrinkage-fitted on the end ring portion 19.

The most important role of the shielding layer 20 is to air-tightly shield the inner peripheral surface of the retaining ring 17 from a chamber R defined by the inner peripheral surface of the retaining ring 17 and the periphery of the shaft 12. The end portion 14b of windings is housed in the chamber R. It is to be noted that the communication between the inner peripheral surface of the retaining ring 17 and the chamber R must not be established even at the axial ends of the shielding layer 20. This is because part of cooling gas tends to make ingress through a gap defined between the axial ends of the retaining ring 17 and the axial ends of the shielding layer 20, and the cooling gas is into contact with the inner periphery of the retaining ring.

To cope with this, there are provided flange portions 21 for the shielding layer at its axially opposite ends. The provision of the flange portions 21 gives a better result as will be described hereinafter. However, the present invention is by no means limited to this instance, as far as desired air tightness may be provided between the retaining ring and the shielding layer.

Operation of the rotor having the shielding layer 20 thus prepared will be described in conjunction with FIG. 3. As shown by arrows B, cooling gas containing salt and moisture is first introduced through openings 22 in the end ring 19 into the chamber R to thereby cool the end portion 14b of the windings, and then part of cooling gas is discharged through a gap defined between the retaining ring 17 and the core 13, while a majority of the cooling gas is introduced into cooling gas inlets 23 provided in the core and then discharged through holes 24 provided in the core outside.

In this case, cooling gas in the chamber R is forced to move toward the inner periphery of the retaining ring 17 due to the centrifugal force during the rotation of the rotor. However, the inner peripheral surface of the retaining ring 17 is shielded from the chamber R by means of the shielding layer 20, so that salt contained in the cooling gas will not cling to the inner peripheral surface of the retaining ring 17, and the cooling gas flowing around the end portion 14b of windings will only remain flowing along the inner peripheral surface of the shielding layer 20, thereby being kept away from the inner peripheral surface of the retaining ring.

Accordingly, even if cooling gas contains salt and other impurities and as a result the retaining ring is subjected to severe stress application, the retaining ring itself will not cause stress-corrosion cracking, thereby presenting a rotor having a high reliability.

In addition, as has been described earlier, the seal between the end of the shielding layer 20 closer to the core 13 and the end of the retaining ring 17 is established by means of the flanges 21, thus dispensing with a highly complicated technique for sealing the layer 20 from the ring 17 as well as eliminating a possibility of leakage in a joint between the two members. Particularly, the flange portion 21 also prevents the cooling gas from being in contact with the end face of the retaining ring closer to the core.

While description has been given of one embodiment of the shielding layer 20, it should be understood that various modifications and alterations may be inferred to those skilled in the art.

FIG. 5 shows another embodiment of the shielding layer. Like parts are designated like reference numerals in common with the embodiment in FIG. 3. In this embodiment, a shielding layer 30 is provided in the form of a varnish layer coated on the inner peripheral surface of the retaining ring 17. In other words, varnish is applied to the inner peripheral surface of the retaining ring 17, before assembly, thereby forming the shielding layer 30, followed by drying. Then, the retaining ring 17 thus prepared is fitted on the rotary shaft 12 rigidly.

It is difficult to coat varnish on the inner peripheral surface of the retaining ring 17, after the completion of assembly, i.e., after shrinkage-fitting of the retaining ring 17, because the insulating cylindrical member 18 and end portion 14b of windings are provided interiorly of the retaining ring 17. Thus, it is preferable that varnish be applied to the inner peripheral surface of the retaining ring 17, before assembly, from viewpoint of operational efficiency.

The varnish to be coated should provide a film of a heat resisting property and some resiliency. More particularly, the retaining ring 17 is shrinkage-fitted on the end ring 19 at a temperature of 200° to 300° C. Thus, varnish should withstand the aforesaid temperature.

In case where the retaining ring 17 is mounted on the end ring 19 by resorting to means other than shrinkage-fitting technique, the varnish should withstand only a temperature of about 80° C. prevailing on the retaining ring which is heated due to eddy current loss resulting from magnetic flux leaking from a stator or due to heat transmitted from windings during operation of an electric machine.

In addition, the retaining ring 17 is positioned in a manner to surround the rotor, so that the retaining ring 17 is subjected to severe vibration, while the retaining ring itself rotates in an elliptic form, because the ring 17 supports the windings provided interiorly thereof. Accordingly, the shielding layer 30 should follow deformation of the retaining ring 30 during the operation.

Any kind of varnishes may be used as far as they meet the aforesaid requirements. However, various tests reveal that polyimide varnish or silicon varnish are recommendable.

The varnish may be applied by using a brush or by a spraying technique. However, it is mandatory to apply varnish evenly so as to provide a film free of pin holes.

The varnish may be applied only to the inner peripheral surface of the retaining ring 17 so that such a portion of the ring 17, which is mostly likely to cause stress-corrosion cracking, may be protected. However, it is desirable that the varnish be applied to an end face 25 of the retaining ring 17, which is adjacent to the end face of the core 13, thereby providing advantages similar to those obtained from the flange portion 21 in the preceding embodiment. In addition to this, there may be achieved another advantage in that even if the varnish film formed on the end face of the retaining ring 17 is peeled, as is often experienced with varnish films in other applications, the direction of a peeled film of vanish is against the direction of the flow of cooling gas which is being discharged, thereby preventing cooling gas from being in contact with the inner peripheral surface of the retaining ring.

With the aforesaid embodiment, wherein the varnish film or layer 30 is provided, assembly of the retaining ring 17 on the rotary shaft 12 is as simple as the prior art retaining ring, because the varnish film is integrally formed on the inner peripheral surface of the retaining ring. Various kinds of attempts may be inferred to those skilled in the art in providing a shielding layer. For instance, nomex film and the like may be formed on the inner peripheral surface of the retaining ring 17 with the same results.

As is apparent from the foregoing description of the rotor according to the present invention, a shielding layer is provided close to the inner peripheral surface of the retaining ring in a manner to air-tightly seal the cooling gas from the inner peripheral surface of a retaining ring. In this respect, the aforesaid cooling gas flows along the end portion of the windings. As a result, even if cooling gas is introduced into the chamber R and is forced toward the inner periphery of the retaining ring due to the centrifugal force resulting from the rotation of the rotor, the inner peripheral surface of the retaining ring may be completely shielded from the cooling gas due to the provision of a shielding layer. In addition, even if cooling gas makes ingress into small gaps between the windings, or between the windings and the end ring or the insulating cylindrical member, the inner peripheral surface of the retaining ring may be sealed from cooling gas by means of the shielding layer. As a result, even if the retaining ring is subjected to severe stress application, there will not be caused stress-corrosion cracking in the retaining ring, thus providing a rotor which is simple in construction and affords high reliability.

What is claimed is:

1. A rotor for use in a rotary electric machine, comprising:
   a rotary shaft;
   a core secured on said rotary shaft;
   windings wound around said core and having end portions thereof protruded from the axial ends of said core, respectively;
   retaining rings fixedly mounted on said rotary shaft in concentric relation to said shaft and extending around the peripheral surfaces of said protruded end portions of said windings respectively for preventing said protruding end portions of said windings from being radially outwardly moved during the rotation of said rotary shaft, each of said retaining rings defining an annular space between its inner peripheral surface and the outer peripheral surface of said rotary shaft, in which cooling gas is introduced in said annular spaces; and
   shielding layers each positioned between the inner peripheral surface of each of said retaining rings and the outer peripheral surface of each of said protruded end portions of said windings, for preventing cooling gas from being in contact with the inner peripheral surfaces of said retaining rings, said shielding layers being in intimate contact with the inner peripheral surfaces of said retaining rings, respectively, and said shielding layers being films of varnish coated on the inner peripheral surfaces of said retaining rings, respectively.

2. A rotor for use in a rotary electric machine, as set forth in claim 1, wherein each of said shielding layers is made of a material which withstands a temperature of at least 300° C.

3. A rotor for use in a rotary electric machine, as set forth in claim 1, wherein each of said shielding layers has a radially and outwardly extending flange connected to at least one axial end thereof closer to said core, said flange sealingly engaging and being in intimate contact with one of the axial end faces of each of said retaining rings closer to said core.

4. A rotor for use in a rotary electric machine, as set forth in claim 3, wherein an end portion of each of said retaining rings and said core adjacent thereto delimit a gap therebetween for permitting an outward flow of cooling gas through said gap, each of said shielding layers having the radially outwardly extending flange in intimate contact with the end portion of a respective retaining ring in the region of a respective gap.

5. A rotor for use in a rotary electric machine, as set forth in claim 1, wherein said shielding layers respectively extend over at least the entirety of the inner peripheral surfaces of said retaining rings for preventing cooling gas from being in contact with the inner peripheral surfaces of said retaining rings.

6. A rotor for use in a rotary electric machine, as set forth in claim 1, wherein an insulating layer is disposed between the inner peripheral surface of said shielding layers and the outer peripheral surface of each of said protruded end portions of said windings.

7. A rotor for use in a rotary electric machine, comprising:
   a rotary shaft;
   a core secured on said rotary shaft;
   windings wound around said core and having end portions thereof protruded from the axial ends of said core, respectively;
   retaining rings fixedly mounted on said rotary shaft in concentric relation to said shaft and extending around the peripheral surfaces of said protruded end portions of said windings respectively for preventing said protruded end portions of said windings from being radially outwardly moved during the rotation of said rotary shaft, each of said retaining rings defining an annular space between its inner peripheral surface and the outer peripheral surface of said rotary shaft, in which cooling gas is introduced in said annular spaces; and
   shielding layers each positioned between the inner peripheral surface of each of said retaining rings and the outer peripheral surface of each of said protruded end portions of said windings, for preventing cooling gas from being contact with the inner peripheral surfaces of said retaining rings, each of said shielding layers having a radially and outwardly extending flange connected to at least one axial end thereof closer to said core, said flange sealingly engaging one of the axial end faces of each of the retaining rings closer to said core, said shielding layers being in intimate contact with the inner peripheral surfaces of said retaining rings, respectively, said extending flange being in intimate contact with one of the end faces of each of said retaining rings closer to said core, said shielding layers being films of varnish coated on the inner peripheral surfaces and the end faces of said retaining rings closer to said core, respectively.

* * * * *